United States Patent Office 2,912,465
Patented Nov. 10, 1959

2,912,465

PROCESS FOR PREPARING ORGANO-PHOSPHINES

Hugh E. Ramsden, Scotch Plains, N.J., assignor to Metal & Thermit Corporation, Rahway, N.J., a corporation of New Jersey No Drawing. Application July 23, 1956
Serial No. 599,319

12 Claims. (Cl. 260—606.5)

The present invention relates to a process for producing organic phosphorus compounds. This application is a continuation-in-part of my earlier application Serial No. 549,541, filed November 28, 1955, now abandoned.

It has now been discovered that organic phosphorus compounds can be prepared by a novel, efficient and economical chemical process.

It is an object of the present invention to provide a process for the production of aliphatic, cycloaliphatic and/or aralkyl substituted phosphorus compounds.

Another object of the invention is to provide a novel process for producing organic phosphorus compounds containing at least one carbon atom bonded to phosphorus.

Still another object of the invention is to provide an efficient process for producing triorganophosphine compounds.

Other objects and advantages of the process will be apparent from the following description and claims.

Generally speaking, the present invention provides a process for producing trivalent and pentavalent phosphorus compounds. The trivalent compounds have the general formula: $R_aR'_bR''_cPX_{3-(a+b+c)}$ wherein $a$, $b$ and $c$ and have a value of 0, 1, 2 or 3; $(a+b+c)$ is equal to 1, 2 or 3; R, R', and R'' are selected from the group consisting of aliphatic groups containing up to 10 carbon atoms and include methyl, ethyl, n-propyl, isopropyl, butyl, amyl, hexyl, cyclohexyl, 2-ethylhexyl, octyl, decyl, octadecyl, hexadecenyl, beta-phenylethyl, allyl, benzyl, etc., substituted groups including $\beta$-chlorophenylethyl, 4-methoxybutyl, 3-phenoxyallyl, chlorophenoxybenzyl, etc., the permissible substitutions being those that do not react with other components of the reaction mixture and/or products under the process conditions; and X is a halogen such as chlorine, bromine and iodine. The pentavalent phosphorus compounds are generally similar to the trivalent phosphorus compounds, with certain variances. Pentavalent phosphorus compounds contain at least 1 ionic bond and when made in accordance with the process of the present invention usually have the general formula $R_4PX$ and $R_3PX_2$. If the last X atom is also substituted by an organic group, at least 1 of the organic groups on the pentavalent phosphorus will be ionically bound to the phosphorus.

Phosphonium compounds having the general formula: $[R_aR'_bR''_cR'''_dP]^+Z^-$ wherein $a$, $b$, $c$ and $d$ have the value 0, 1, 2, 3 or 4; the sum $(a+b+c+d)$ being equal to 4; and R, R', R'' having the significance ascribed to them above; R''' is defined as is R, R', or R''; and Z is a negative radical such as a OH, Cl, Br, I, RCOO, etc., may be produced from the trivalent phosphorus compounds. Compounds somewhat similar to the phosphonium compounds, having the formula $$[R_aR'_bR''_cR'''_dP]^-Y^+$$

wherein Y is a positive radical such as Na+, Li+, etc., may also be prepared from the trivalent phosphorus compounds.

The present process for producing organic phosphorus compounds comprises reacting substituted or unsubstituted hydrocarbon magnesium chloride complexes with a phosphorus halide such as an organophosphorus halide, a phosphorus trihalide or a phosphorus pentahalide.

The preparation of the trivalent phosphorus compounds are illustrated by the following equation:

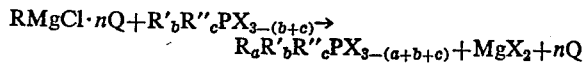
$$RMgCl \cdot nQ + R'_bR''_cPX_{3-(b+c)} \rightarrow$$
$$R_aR'_bR''_cPX_{3-(a+b+c)} + MgX_2 + nQ$$

wherein X is selected from the group consisting of chlorine, bromine and iodine; $a$, $b$ and $c$ equal 0, 1 or 2; $b+c$ equals 0, 1 or 2; $a+b+c$ equals 1, 2 or 3; R, R' and R'' have the same significance ascribed to them above; and $n$ equals 1, 2 or 3. Phosphorus chlorides are the preferred reactants. The following type compounds are the products included within the general type formulas of the phosphorus compounds produced: RR'R''P, RR'PX, RPX_2. When an organophosphine halide is utilized as a reactant, rather than a phosphorus trihalide, said organophosphine halide may be prepared in accordance with the present process. An aspect of the present invention is illustrated in the following equation:

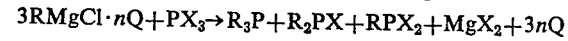
$$3RMgCl \cdot nQ + PX_3 \rightarrow R_3P + R_2PX + RPX_2 + MgX_2 + 3nQ$$

wherein, R, n, Q and X are as defined above. The process may be so controlled that any of the aforementioned products or a mixture of products may be prepared. It is also possible to carry out the reaction stepwise by first reacting an organomagnesium chloride complex with a phosphorus trihalide and then further reacting the product of this reaction with an organomagnesium chloride complex.

Another aspect of the present invention is illustrated by the following equation:

$$3RMgClnQ + PCl_5 \rightarrow R_3PCl_2 + 3MgCl_2 + 3nQ$$

This illustrates the preparation of pentavalent phosphorus compounds.

The phosphonium compounds made in accordance with this invention are prepared by reacting an excess of the complex $RMgCl \cdot nQ$ with a phosphorus trihalide e.g., $PCl_3$ in the presence of atmospheric oxygen. This reaction produces the phosphonium base which may be converted to a phosphonium salt by a strong acid. The sequence of reaction is illustrated by the following:

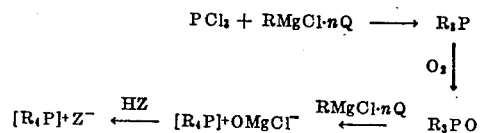

$$PCl_3 + RMgCl \cdot nQ \longrightarrow R_3P$$
$$\downarrow O_2$$
$$[R_4P]^+Z^- \xleftarrow{HZ} [R_4P]^+OMgCl^- \xleftarrow{RMgCl \cdot nQ} R_3PO$$

The preparation of the aliphatic, cycloaliphatic and/or aralkyl magnesium chloride complexes, utilized as reactant(s) in the present process, is described in U.S. application Serial No. 549,541, now abandoned. Compound Q is a substituted or unsubstituted heterocyclic compound (having 5 or 6 atoms in the ring) containing one oxygen atom in the ring structure; the other ring atoms being carbon with the exception that one nitrogen atom may be substituted for any carbon atom other than those carbon atoms adjacent to the oxygen. The heterocyclic compounds may contain a single unsaturated bond, as in dihydropyran. Compounds within this definition include tetrahydrofuran, tetrahydropyran, 2-methyltetrahydrofuran, 2-ethoxytetrahydropyran, tetrahydrofurfuryl ethyl ether, dihydropyran, and N-methylmorpholine. Permissible substitutions are groups which are not reactive with organomagnesium chloride complexes, or with any of the other components and products of the reaction mixtures of the present process, and include substituted and unsubstituted alkyl, aryl, alkoxy and aryloxy groups (all allowable substitutes being those unreactive to other components of the reaction mixture as specified hereinbefore). Where nitrogen replaces a carbon atom, hydrogen on the nitrogen atom must be substituted with a group unreactive to the reactants or reaction products. Preferred Q compounds are: tetrahydrofuran, tetrahydropyran, 2-methyltetrahydrofuran and tetrahydrofurfuryl ethyl ether.

When the aliphatic, cycloaliphatic and/or aralkyl magnesium chloride complex is reacted with the halogen phosphorus compound, the product may be any of the type compounds listed hereinbefore (as products) or any mixture of them dependent upon the reactants used, the relative proportions of the products used, and the process conditions. By control of the process variables, it is possible to produce a product containing a preponderance of a desired reaction product. Thus, when an excess of $RMgCl \cdot nQ$ is reacted with $PX_3$ in an inert atmosphere, the desired product would be $R_3P$.

If all of the halogen in the phosphorus halide is to be replaced, the phosphorus containing halide is added to the aliphatic, cycloaliphatic and/or aralkyl magnesium chloride complex, usually dissolved in excess compound Q. If a substituted phosphorus halide is desired, the organo magnesium chloride complex is preferably added to the phosphorus containing reactant dissolved in an inert solvent. The reaction is preferably agitated. The reaction temperature will vary with the reactants and solvents utilized and the products desired, and will usually be between room temperature and the reflux temperature of the reaction mixture. The reaction is exothermic. For special conditions it may be desirable and/or necessary to carry the reaction out, at low temperatures, or under reduced pressures. The reaction is preferably carried out in an inert atmosphere, usually nitrogen. The reactants and solvents are also preferably prepared in an inert atmosphere. The reaction products include one or more phosphine compounds, the magnesium halide salt, compound Q, and solvent if used. These may be separated by conventional means, e.g., hydrolysis, solvent extraction, filtration and distillation. The solvent is easily distilled off. The desired reaction product is usually distilled at reduced pressure.

The solvent utilized must be inert to the other components of the reaction mixture under the process conditions and is preferably an organic solvent that distills below 150° C. The preferred solvents include substituted and unsubstituted tetrahydrofuran, tetrahydropyran, heptane, hexane, pentane, octane, isooctane, cumene, xylene, etc. A solvent system containing more than one component may also be used.

$RMgCl \cdot nQ$ complexes in which Q is tetrahydrofuran are especially preferred. This compound is commercially available relatively inexpensive and such complexes, when utilized in this process, provide excellent yields. For similar reasons the organophosphorus chlorides and phosphorus trichlorides are preferred reactants.

The following examples are further illustrative of the present invention. It is to be understood, however, that this invention is not restricted thereto.

*Example 1.—Triamylphosphine*

To three moles of n-amylmagnesium chloride-tetrahydrofuran complex is slowly added one mole of freshly distilled phosphorus trichloride dissolved in heptane solvent. After completion of the addition the mixture is refluxed for 2-3 hours, cooled and filtered. The solvents tetrahydrofuran and heptane are distilled off and triamylphosphine is distilled at reduced pressure. The entire operation was carried out in a nitrogen atmosphere.

*Example 2.—Tributylphosphine*

Three moles of butylmagnesium chloride dissolved in tetrahydrofuran is added to one mole of phosphorus trichloride dissolved in heptane at reflux temperature. After completion of the addition, the reaction mixture is held at reflux for 2 hours, followed by hydrolysis and separation of the aqueous and organic phases. Tributylphosphine is separated in the organic phase by distillation (39% yield). The entire operation was carried out in a nitrogen atmosphere.

*Example 3.—Tricyclopentylphosphine*

To three moles of cyclopentylmagnesium bromide-tetrahydropyran in excess tetrahydropyran is added one mole of phosphorus trichloride dissolved in heptane solvent. After completion of the addition the mixture is refluxed for 2-3 hours, cooled and filtered. The solvents tetrahydropyran and heptane are distilled off and tricyclopentylphosphine is distilled at reduced pressure.

*Example 4.—Triallylphosphine*

Three moles of allylmagnesium chloride-tetrahydrofurfuryl ethyl ether is slowly added to phosphorus trichloride, dissolved in pentane. After completion of the addition the mixture is refluxed for several hours, cooled, hydrolyzed and filtered. The solvents are distilled off and triallylphosphine separated at reduced pressure. The entire operation is carried out in a nitrogen atmosphere.

*Example 5.—Tribenzylphosphine*

Three moles of benzylmagnesium chloride-tetrahydrofurfuryl ethyl ether complex was slowly added to one mole of phosphorus trichloride dissolved in benzene solvent. The mixture is heated at reflux, stirred for one hour, cooled, hydrolyzed and the phases separated. The solvents are distilled off and tribenzylphosphine is distilled at reduced pressure. The entire operation is carried out in a nitrogen atmosphere.

*Example 6.—Octyldichlorophosphine, dioctylchlorophosphine*

One mole of octylmagnesium chloride in tetrahydrofuran is slowly added to 1 mole of phosphorus trichloride dissolved in heptane. After completion of the addition, the mixture is refluxed, cooled and filtered. The heptane and tetrahydrofuran are distilled off and the octyldichlorophosphine and dioctylchlorophosphine are distilled at reduced pressure.

*Example 7.—Dibutyloctylphosphine*

One-half mole of octyldichlorophosphine dissolved in heptane is slowly added to 1 mole of butylmagnesium chloride in tettrahydrofuran. The mixture is agitated and held at reflux for 2 hours, followed by hydrolysis and separation of the aqueous and organic phases. Dibutyloctylphosphine is isolated by distillation of the organic phase under reduced pressure, after removal of solvent. Nitrogen atmosphere is used throughout the preparation.

The process of the present invention is an efficient and economical process for producing organic phosphorus compounds, some of which are known and widely used commercially. These compounds exhibit great reactivity with such elements as oxygen and fluorine and may be utilized as reducing agents, catalysts, oxygen getters, defluorination reagents, etc. These compounds are also utilized as intermediates in the preparation of various insecticides.

While the invention has been described with particular reference to specific embodiments, it is to be understood that it is not limited thereto but is to be construed broadly and restricted solely by the scope of the appended claims.

I claim:

1. A process for producing organic phosphorus compounds which comprises mixing a compound having the general formula $RMgCl \cdot nQ$ with a phosphorus halide selected from the class consisting of phosphorus trihalides, phosphorus pentahalides and hydrocarbonphosphorus halides having up to 10 carbon atoms in each hydrocarbon group thereof, wherein n is an integer from 1 to 3, R is an aliphatic group bonded to the magnesium atom through a saturated carbon atom and having up to 10 carbon atoms, and Q is a cyclic ether containing from 5 to 6 atoms in the ring and wherein (a) there is only one oxygen atom in the ring, (b) the other ring atoms are carbon, (c) one ring carbon separated from the oxygen atom in the ring by two carbon atoms may be replaced by an alkyl substituted nitrogen atom, (d) the ring contains not more than one double bond, (e) at least one carbon atom adjacent the oxygen atom in said ring being free of any substituents other than hydrogen, (f) said ether contains no substituent which reacts with an organomagnesium chloride.

2. The process of claim 1 in which the phosphorus halide is in solution with a cyclic ether as defined therein.

3. The process of claim 1 in which the phosphorus halide is a phosphorus trihalide.

4. The process of claim 1 in which R is the butyl group.

5. The process of claim 1 wherein compound Q is selected from the class consisting of tetrahydrofuran, tetrahydropyran, 2-ethoxytetrahydropyran, 2-methyltetrahydrofuran, tetrahydrofurfuryl ethyl ether, dihydropyran and N-methyl morpholine.

6. The process of claim 5 in which a phosphorus chloride is used.

7. The process of claim 5 in which the phosphorus halide reactant is dissolved in an inert hydrocarbon solvent.

8. The process of claim 5 in which R is a butyl group.

9. The process in claim 5 in which the temperature is maintained at room temperature.

10. The process in claim 5 in which Q is tetrahydrofuran.

11. The process in claim 5 in which Q is tetrahydropyran.

12. The process for preparing tributylphosphorus which comprises mixing a tetrahydrofuran solution of phosphorus trichloride with butylmagnesium chloride, said butylmagnesium chloride having been prepared by reacting butyl chloride with magnesium in the presence of an amount of tetrahydrofuran at least molecularly equal to the amount of butyl chloride used, and recovering tributylphosphorus from the reaction mixture.

References Cited in the file of this patent
FOREIGN PATENTS
516,306    Canada _____ Sept. 6, 1955

OTHER REFERENCES

Kosolapoff: "Organophosphorus Compounds," John Wiley & Sons, Inc., New York (1950), pages 16–17.

Wertheim: "Textbook of Organic Chemistry," third edition, McGraw-Hill Book Co., Inc., New York (1951), page 640.